Aug. 30, 1938.   A. TURRIAN   2,128,863
ELEVATION AND SLOPE INDICATOR
Filed Jan. 31, 1938
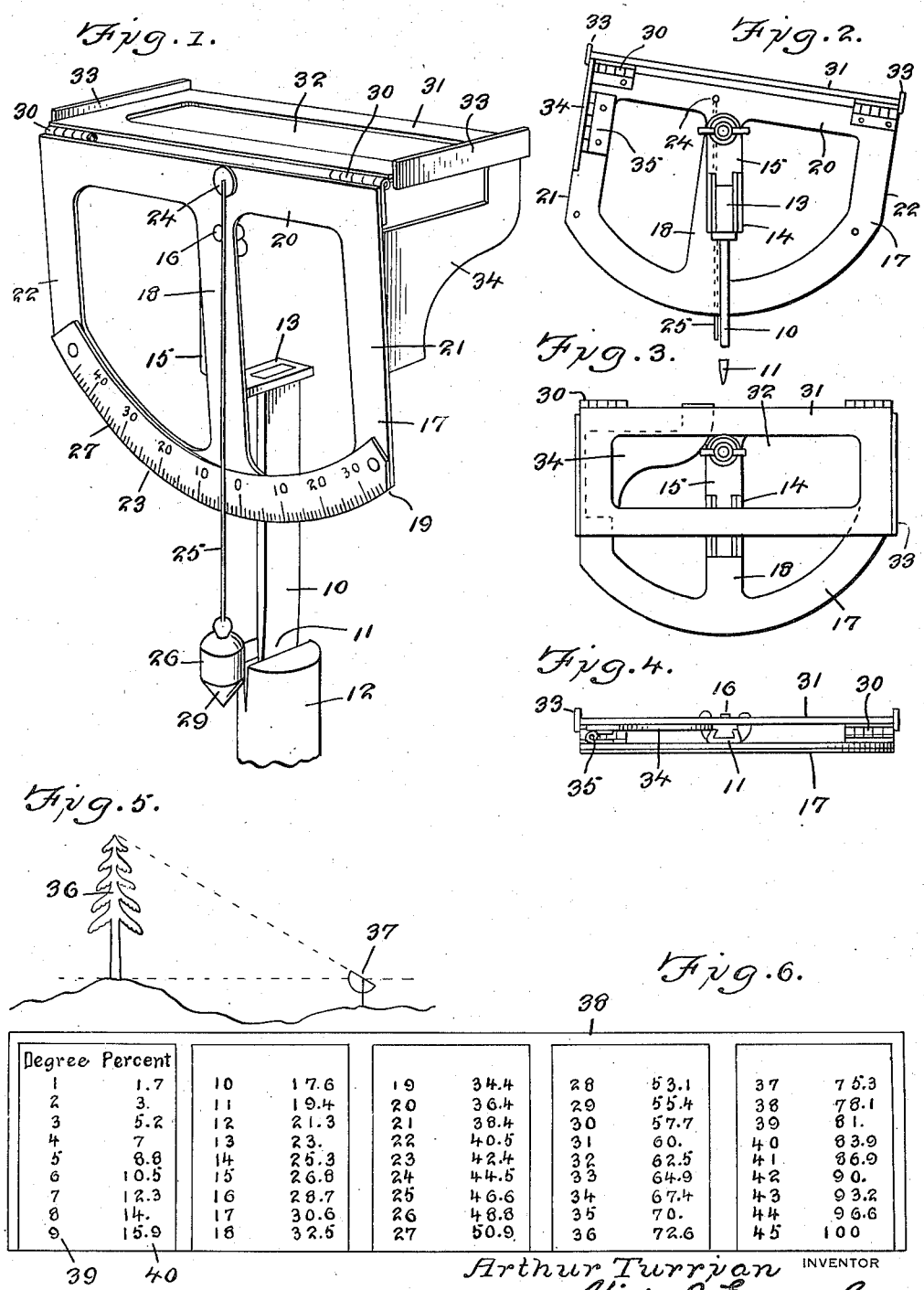
| Degree | Percent | | | | | | | | |
|--------|---------|----|------|----|------|----|------|----|------|
| 1 | 1.7 | 10 | 17.6 | 19 | 34.4 | 28 | 53.1 | 37 | 75.3 |
| 2 | 3. | 11 | 19.4 | 20 | 36.4 | 29 | 55.4 | 38 | 78.1 |
| 3 | 5.2 | 12 | 21.3 | 21 | 38.4 | 30 | 57.7 | 39 | 81. |
| 4 | 7 | 13 | 23. | 22 | 40.5 | 31 | 60. | 40 | 83.9 |
| 5 | 8.8 | 14 | 25.3 | 23 | 42.4 | 32 | 62.5 | 41 | 86.9 |
| 6 | 10.5 | 15 | 26.8 | 24 | 44.5 | 33 | 64.9 | 42 | 90. |
| 7 | 12.3 | 16 | 28.7 | 25 | 46.6 | 34 | 67.4 | 43 | 93.2 |
| 8 | 14. | 17 | 30.6 | 26 | 48.8 | 35 | 70. | 44 | 96.6 |
| 9 | 15.9 | 18 | 32.5 | 27 | 50.9 | 36 | 72.6 | 45 | 100 |
Arthur Turrian   INVENTOR
BY Victor J. Evans & Co.
ATTORNEYS Patented Aug. 30, 1938

2,128,863

UNITED STATES PATENT OFFICE 2,128,863

ELEVATION AND SLOPE INDICATOR

Arthur Turrian, Schenectady, N. Y.

Application January 31, 1938, Serial No. 187,945

3 Claims. (Cl. 33—70)

The invention relates to a measuring instrument and more especially to an elevation and slope indicator device.

The primary object of the invention is the provision of a device of this character, wherein the same is compact and when not in use is foldable to occupy minimum space so that it can be carried in the pocket or otherwise and when unfolded for use can be supported perpendicularly upon a stump, stick or other like support so that elevations and slopes can be measured with a degree of accuracy.

Another object of the invention is the provision of a device or instrument of this character, wherein measurements or heights, distances traced and leveling obtained as well as slopes or inclines are had, the device being adaptable for use by architects, builders, foresters, teachers, surveyors or the like.

A further object of the invention is the provision of a device or instrument of this character, which is simple in construction, thoroughly reliable and efficient in operation, light in weight yet strong, durable, susceptible of easy adjustment and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a perspective view of the device or instrument constructed in accordance with the invention and anchored in a support for use.

Figure 2 is a rear elevation thereof.

Figure 3 is a plan view showing the device folded.

Figure 4 is an edge view of the device folded.

Figure 5 is a diagrammatic elevation showing the device set for determining the height of an object with respect to a level.

Figure 6 is a plan view of a degree and percentage table for use in measuring work in the use of the device or instrument.

Similar reference characters indicate corresponding parts throughout the several views in the drawing.

Referring to the drawing in detail, the instrument or device comprises an anchoring blade or staff 10 having at its lower end a penetrating tip 11 to be driven into a stake or other upstanding support 12 when the instrument or device is in use. At the upper end of the blade or staff 10 is fixed the horizontal arm of a substantially L-shaped bracket 13, its vertical or upstanding right angular arm to the horizontal is adapted to have detachably coupled thereto as at 14 a bearing extension 15 which carries a pivot 16 removably and swingingly connecting thereto a skeleton scale frame 17. This frame includes an intermediate web 18, a lower sector edge portion 19, a straight upper edge portion 20 and outer straight edge end portions 21 and 22, respectively.

Following the sector edge portions 19 and at the outer exposed side of the frame 17 is a degree scale plate 23 while suspended close to the upper straight edge of the portion 20 of said frame 17 and hung therefrom at 24 is a plumb cord 25, this being removable from the frame 17 and at its lower end carries a plumb bob or conical weight 26, the cord or line 25 being adapted to confront the scale plate 23 and coact with the graduations or degree marks 27 thereon in the use of the instrument or device. The bob or weight 26 is of course free from contact with a foundation or devoid of any dragging contact with an object beneath its point 29 when the instrument or device is in use for accuracy in the working thereof.

The frame 21 at the straight edge of the portion 20 carries hinges 30, these being also connected with an aim shelf or ledge 31 which has an elongated longitudinally directed center opening 32 while at opposite ends are aim ridges 33, the shelf or ledge 31 being foldable downwardly and inwardly against the frame 21 when not in use, the hinges 30 being for the purpose of allowing the folding and unfolding of said ledge or shelf. Carried by the frame 21 at its rear is a foldable prop or bracket 34, being hinged at 35 to said frame 21 for the folding of the same and this proper or bracket 34 supports the ledge or shelf 31 when unfolded and at right angles to the frame 21.

In Figure 5 of the drawing there is shown an example of the use of the instrument for determining the height of an object denoted at 36, the instrument being set up for this purpose as at 37, while in Figure 6 is shown a table 38 with degree and percent indicia as at 39 and 40, respectively, being usable with the instrument for calculation with the scale 27 on a reading thereof in association with the plumb cord or line 25 through adjustment of the aim ledge or shelf 31, the table 38 being of tangents and involves degrees thereof and decimal percentages.

What is claimed is:

1. An instrument of the character described comprising an anchoring staff, a bracket carried by said staff, a sector frame having a segmental scale, a pivotal coupling between the frame and said bracket for separable connection therebetween, a foldable shelf carried by the frame, a swinging prop on the frame and coacting with the shelf to hold the same against folding movement, and a plumb bob hung from said frame and coacting with the scale.

2. An instrument of the character described comprising an anchoring staff, a bracket carried by said staff, a sector frame having a segmental scale, a pivotal coupling between the frame and said bracket for separable connection therebetween, a foldable shelf carried by the frame, a swinging prop on the frame and coacting with the shelf to hold the same against folding movement, a plumb bob hung from said frame and coacting with the scale, and aim ridges at opposite ends of said shelf.

3. An instrument of the character described comprising an anchoring staff, a bracket carried by said staff, a sector frame having a segmental scale, a pivotal coupling between the frame and said bracket for separable connection therebetween, a foldable shelf carried by the frame, a swinging prop on the frame and coacting with the shelf to hold the same against folding movement, a plumb bob hung from said frame and coacting with the scale, and aim ridges at opposite ends of said shelf, the said coupling having separable slidable connection with the bracket.

ARTHUR TURRIAN.